US012115587B2

(12) United States Patent
Muranishi

(10) Patent No.: US 12,115,587 B2
(45) Date of Patent: Oct. 15, 2024

(54) CUTTING INSERT, CUTTING TOOL, AND METHOD FOR MANUFACTURING MACHINED PRODUCT

(71) Applicant: KYOCERA Corporation, Kyoto (JP)

(72) Inventor: Toru Muranishi, Moriyama (JP)

(73) Assignee: KYOCERA Corporation, Kyoto (JP)

(*) Notice: Subject to any disclaimer, the term of this patent is extended or adjusted under 35 U.S.C. 154(b) by 554 days.

(21) Appl. No.: 17/432,136

(22) PCT Filed: Feb. 25, 2020

(86) PCT No.: PCT/JP2020/007408
§ 371 (c)(1),
(2) Date: Aug. 19, 2021

(87) PCT Pub. No.: WO2020/175457
PCT Pub. Date: Sep. 3, 2020

(65) Prior Publication Data
US 2022/0184711 A1    Jun. 16, 2022

(30) Foreign Application Priority Data
Feb. 26, 2019  (JP) .................... 2019-032493

(51) Int. Cl.
*B23B 27/16*    (2006.01)
*B23B 1/00*    (2006.01)
*B23B 27/04*    (2006.01)

(52) U.S. Cl.
CPC ............ *B23B 27/1611* (2013.01); *B23B 1/00* (2013.01); *B23B 27/04* (2013.01); *B23B 2200/088* (2013.01); *B23B 2205/02* (2013.01)

(58) Field of Classification Search
CPC ............ B23B 27/04; B23B 2200/0423; B23B 2200/085; B23B 2200/165; B23B 27/1611; B23B 2205/02; B23B 27/086; B23B 1/00
See application file for complete search history.

(56) References Cited

U.S. PATENT DOCUMENTS

2006/0147281 A1    7/2006  Nagaya et al.
2009/0285645 A1    11/2009 Hecht

FOREIGN PATENT DOCUMENTS

| CN | 102089105 A | | 6/2011 | |
|---|---|---|---|---|
| DE | 3420653 A | * | 12/1985 | ............ B23B 27/04 |
| DE | 102011053760 A1 | * | 3/2013 | ............ B23B 27/04 |
| JP | 2001162431 A | * | 6/2001 | ............ B23B 27/04 |
| JP | 2006-167874 A | | 6/2006 | |
| JP | 2011-520630 A | | 7/2011 | |

* cited by examiner

*Primary Examiner* — Sara Addisu
(74) *Attorney, Agent, or Firm* — Volpe Koenig

(57) ABSTRACT

A cutting insert may include an upper surface, a lower surface, a front lateral surface and a rear lateral surface. The upper surface may include a first upper cutting edge and an upper constraining surface. The lower surface may include a lower constraining surface. The lower constraining surface may include a lower groove. The lower groove may include a first region, a second region and a third region. The first region may be located on a side opposite to the upper constraining surface. A wedge angle of the first region may be a first angle, a wedge angle of the second region may be a second angle, and a wedge angle of the third region may be a third angle. The first angle may be smaller than each of the second angle and the third angle.

20 Claims, 16 Drawing Sheets

A1

CUTTING INSERT, CUTTING TOOL, AND METHOD FOR MANUFACTURING MACHINED PRODUCT

CROSS-REFERENCE TO RELATED APPLICATION

This application is a national stage entry according to 35 U.S.C. 371 of PCT Application No. PCT/JP2020/007408, filed on Feb. 25, 2020, which claims priority to Japanese Application No. 2019-032493, filed Feb. 26, 2019, which are entirely incorporated herein by reference.

FIELD OF INVENTION

The present disclosure may relate to a cutting insert for use in a cutting process. Specifically, the present disclosure may relate to a rotary tool for use in a turning process, such as grooving process.

TECHNICAL BACKGROUND

For example, a cutting tip is discussed in Japanese Unexamined Patent Application Publication No. 2011-520630 (Patent Document 1) as a cutting insert for use in a turning process of a workpiece, such as metal. The cutting tip (cutting insert) discussed in Patent Document 1 may include an upper surface, a lower surface and a peripheral lateral surface. The peripheral lateral surface may include a front end surface and a rear end surface. The lower surface may include a constraining surface in the shape of a V-shaped groove extended along a central axis (vertical axis). The constraining surface may include a first surface component located on a side of the front end surface, and a second surface component located on a side of the rear end surface. A wedge angle in the second surface component may be smaller than a wedge angle in the first surface component.

In cases where a cutting process is carried out using the cutting insert discussed in Patent Document 1, cutting load due to a principal force in the cutting process may also tend to be transmitted to the second surface component because the second surface component is located on the side of the rear end surface. Durability of the cutting insert may be lowered in the second surface component because the wedge angle in the second surface component is relatively small.

SUMMARY

A cutting insert in a non-limiting aspect of the present disclosure may include an upper surface, a lower surface, a front lateral surface and a rear lateral surface. The lower surface may be located on a side opposite to the upper surface. The front lateral surface may be located between the upper surface and the lower surface. The rear lateral surface may be located between the upper surface and the lower surface, and may be located on a side opposite to the front lateral surface. The upper surface may include a first upper cutting edge and an upper constraining surface. The first upper cutting edge may be located on an intersection with the front lateral surface. The upper constraining surface may be located closer to the rear lateral surface than the first upper cutting edge, and may be contactable with a holder. The lower surface may include a lower constraining surface contactable with the holder. The lower constraining surface may include a lower groove having a V-shape extended from a region located near the front lateral surface toward the rear lateral surface. The lower groove may include a first region, a second region and a third region. The first region may be located on a side opposite to the upper constraining surface. The second region may be located closer to the front lateral surface than the first region. The third region may be located closer to the rear lateral surface than the first region. A wedge angle of the first region may be a first angle, a wedge angle of the second region may be a second angle, and a wedge angle of the third region may be a third angle in a cross section orthogonal to an extending direction of the lower groove. The first angle may be smaller than each of the second angle and the third angle.

DETAILED DESCRIPTION

<Inserts>

Figure 1:
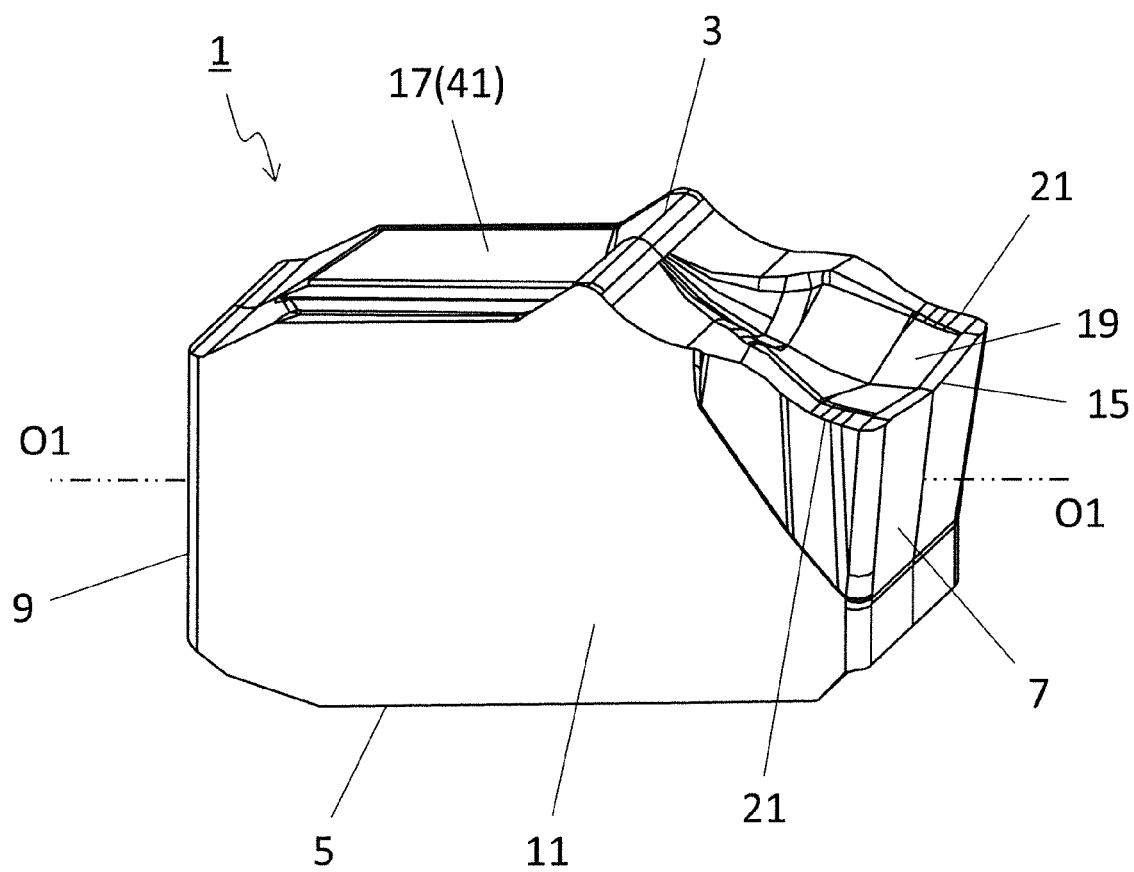
FIG. 1 is a perspective view illustrating a cutting insert in a non-limiting embodiment.
Figure 2:
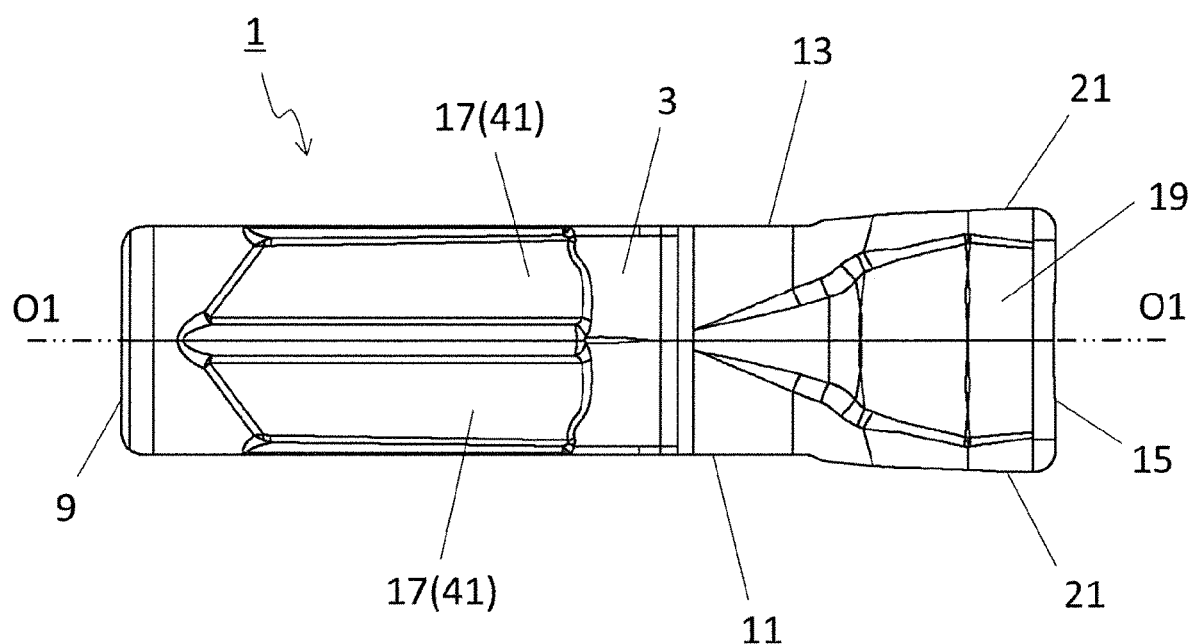
FIG. 2 is a plan view of the cutting insert illustrated in FIG. 1 as viewed from a side of an upper surface.
Figure 2:

Cutting inserts 1 (hereinafter also referred to simply as "inserts 1") in non-limiting embodiments of the present disclosure may be described in detail below with reference to the drawings. For the sake of description, the drawings referred to in the following may illustrate, in simplified form, only main members necessary for describing the embodiments. The cutting inserts 1 may therefore be capable of including any arbitrary structural member not illustrated in the drawings referred to. Dimensions of the members in each of the drawings may faithfully represent neither dimensions of actual structural members nor dimensional ratios of these members.

The insert 1 may include an upper surface 3, a lower surface 5, a front lateral surface 7 and a rear lateral surface 9. The lower surface 5 may be located on a side opposite to the upper surface 3. The front lateral surface 7 and the rear lateral surface 9 may be individually located between the upper surface 3 and the lower surface 5. In this case, the rear lateral surface 9 may be located on a side opposite to the front lateral surface 7. The front lateral surface 7 and the rear lateral surface 9 may individually connect to the upper surface 3 and the lower surface 5.

In addition to these surfaces, the insert 1 may include a first lateral surface 11 and a second lateral surface 13. The first lateral surface 11 and the second lateral surface 13 may be located between the upper surface 3 and the lower surface 5 and between the front lateral surface 7 and the rear lateral surface 9. In this case, the first lateral surface 11 and the second lateral surface 13 may individually connect to the upper surface 3, the lower surface 5, the front lateral surface 7 and the rear lateral surface 9.

The insert 1 may have a quadrangular prism shape including the upper surface 3, the lower surface 5, the front lateral surface 7, the rear lateral surface 9, the first lateral surface 11 and the second lateral surface 13 as illustrated in FIG. 1. The insert 1 may have a prism shape extended along a central axis O1 from a front end to a rear end as in an embodiment illustrated in FIG. 1.

The front lateral surface 7 may be located at the front end, and the rear lateral surface 9 may be located at the rear end. As in the embodiment illustrated in FIG. 1, the front lateral surface 7 and the rear lateral surface 9 may have a quadrangular shape, and the four surfaces of the upper surface 3, the lower surface 5, the first lateral surface 11 and the second lateral surface 13 may be individually extended from the front lateral surface 7 toward the rear lateral surface 9.

Each of the upper surface 3, the lower surface 5, the front lateral surface 7, the rear lateral surface 9, the first lateral surface 11 and the second lateral surface 13 is not limited to specific dimensions. For example, a length of the upper surface 3 in a direction along the central axis O1 in a front view (top view) of the upper surface 3 may be set to approximately 3-50 mm. A length of the upper surface 3 in a direction orthogonal to the central axis O1 in a top view may be set to approximately 1.5-15 mm. A height of the insert 1 indicated by a distance between the upper surface 3 and the lower surface 5 may be set to approximately 2-20 mm.

The upper surface 3 may include a first upper cutting edge 15 and an upper constraining surface 17. The first upper cutting edge 15 may be located on an intersection with the front lateral surface 7 on the upper surface 3. The first upper cutting edge 15 may be located all over the intersection of the upper surface 3 and the front lateral surface 7, or may be located only a part of the intersection of the upper surface 3 and the front lateral surface 7. The first upper cutting edge 15 may be used for cutting out a workpiece. The first upper cutting edge 15 in the embodiment illustrated in FIG. 1 may generally be called a front cutting edge or main cutting edge.

The upper constraining surface 17 may be located closer to the rear lateral surface 9 than the first upper cutting edge 15. The upper constraining surface 17 may be contactable with a holder when the insert 1 is attached to the holder. The upper constraining surface 17 may include an end part on a side of the rear end on the upper surface 3, namely, an intersection with the rear lateral surface 9, or may be located away from the intersection.

The upper surface 3 may include a rake surface 19 located along the first upper cutting edge 15. The rake surface 19 may connect to the upper constraining surface 17, or may be located away from the upper constraining surface 17. The upper surface 3 may further include, as a cutting edge, a second upper cutting edge 21 in addition to the first upper cutting edge 15.

The second upper cutting edge 21 may be located on an intersection with the first lateral surface 11 on the upper surface 3, or an intersection with the second lateral surface 13 on the upper surface 3. For example, the second upper cutting edge 21 may be located on an intersection with the first lateral surface 11 on the upper surface 3, and on an intersection with the second lateral surface 13 on the upper surface 3 as illustrated in FIG. 1.

The lower surface 5 may include a lower constraining surface 23. The lower constraining surface 23 may be located all over the lower surface 5 or only a part of the lower surface 5. The lower constraining surface 23 may be contactable with the holder when the insert 1 is attached to the holder. The insert 1 can be held by the holder by bringing the lower constraining surface 23 and the upper constraining surface 17 into contact with the holder.

The lower constraining surface 23 may include a lower groove 25 extended from a region located near the front lateral surface 7 toward the rear lateral surface 9. The lower groove 25 may open into the front lateral surface 7 or may be located away from the front lateral surface 7. Similarly, the lower groove 25 may open into the rear lateral surface 9 or may be located away from the rear lateral surface 9. The lower groove 25 may be located away from the front lateral surface 7 and the rear lateral surface 9 as in an embodiment illustrated in FIG. 3.

Figure 3:
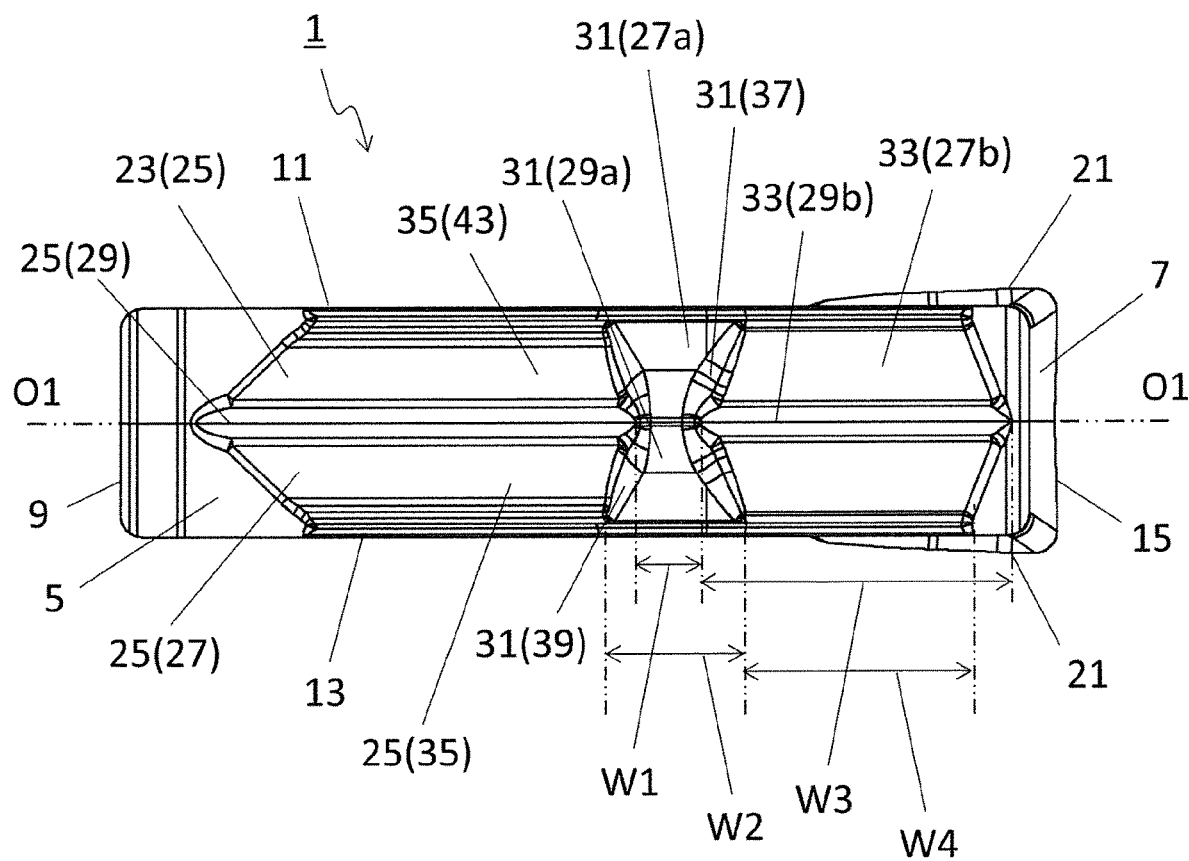
FIG. 3 is a plan view of the cutting insert illustrated in FIG. 1 as viewed from a side of a lower surface.
Figure 4:
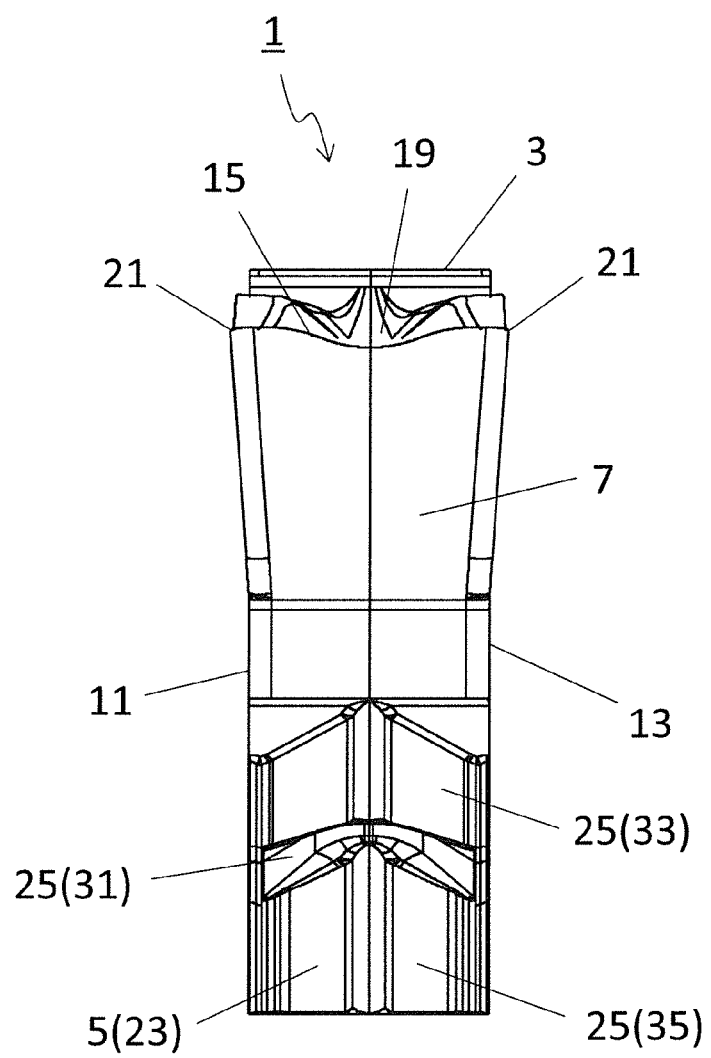
FIG. 4 is a plan view of the cutting insert illustrated in FIG. 2 as viewed from a side of a front lateral surface.
Figure 5:
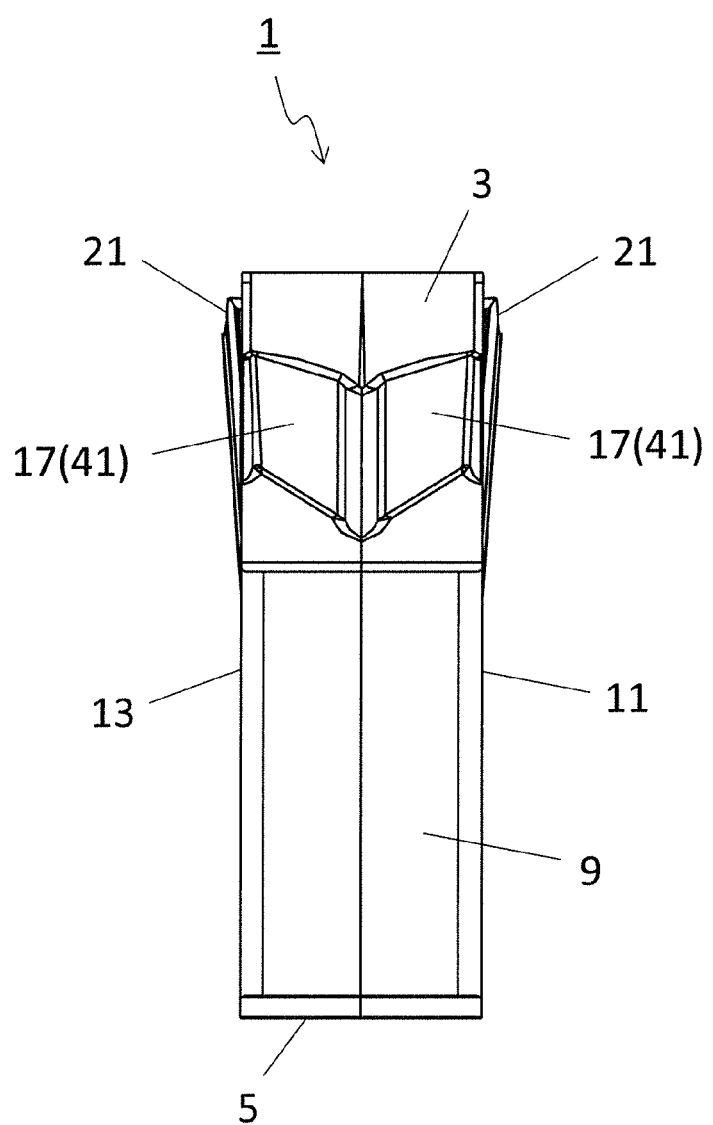
FIG. 5 is a plan view of the cutting insert illustrated in FIG. 2 as viewed from a side of a rear lateral surface.
Figure 6:
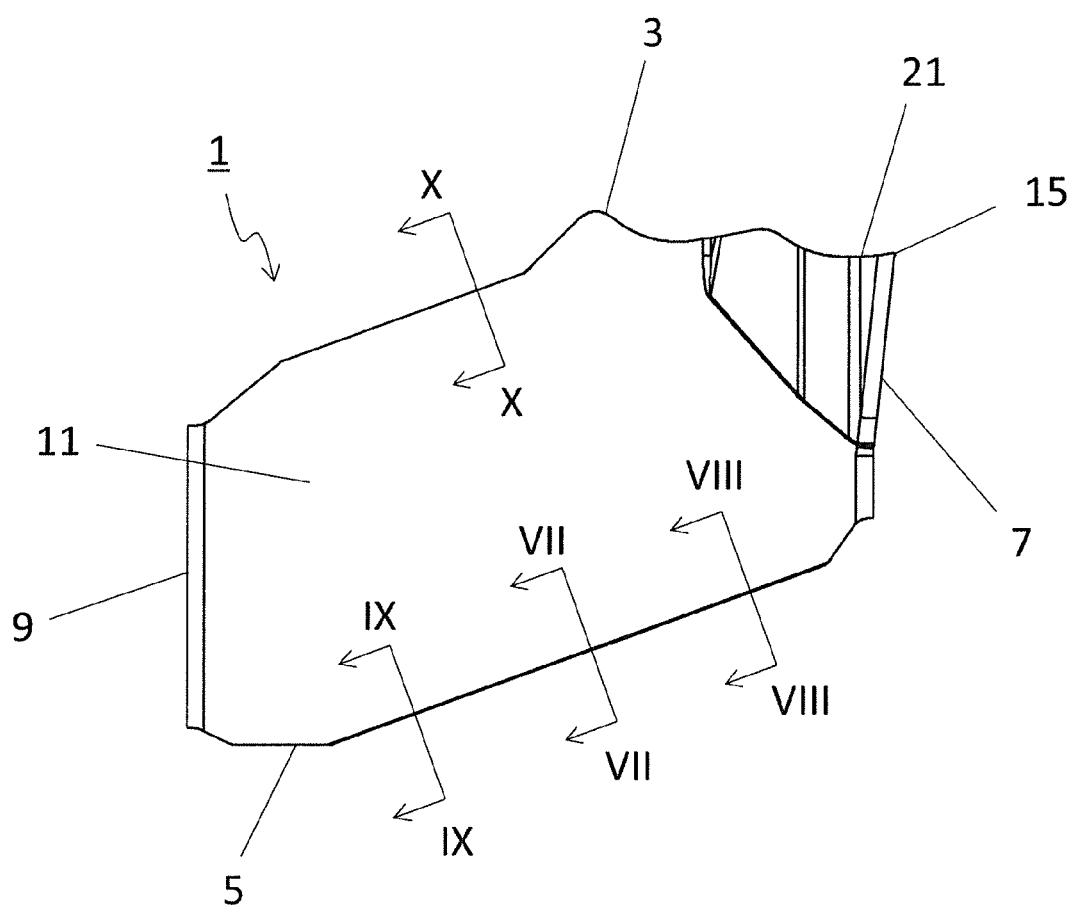
FIG. 6 is a side view of the cutting insert illustrated in FIG. 2 as viewed from an A1 direction.
Figure 7:
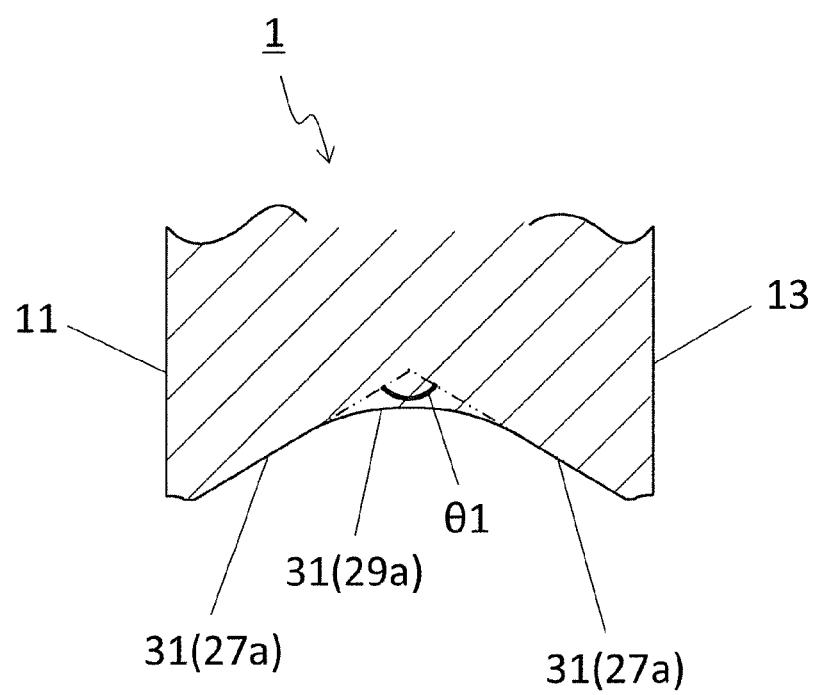
FIG. 7 is a cross-sectional view taken along the line VII-VII in the cutting insert illustrated in FIG. 6.

In other words, the lower groove 25 may be extended parallel to the central axis O1 because the lower groove 25 is extended from a side of the front lateral surface 7 toward a side of the rear lateral surface 9 in the embodiment illustrated in FIG. 3. The lower groove 25 may have a V-shape in a cross section orthogonal to an extending direction thereof, namely, a cross section orthogonal to the central axis O1.

As used herein, the phrase that the lower groove 25 has the V-shape may denote that the lower groove 25 includes a pair of inclined surfaces 27 having a larger distance therebetween as going away from a bottom of the lower surface 25. Therefore, for example, a concave curved surface 29 to connect the pair of inclined surfaces 27 may be located on the bottom of the lower groove 25.

The lower groove 25 may include a first region 31, a second region 33 and a third region 35. The first region 31 may be located on a side opposite to the upper constraining surface 17. The second region 33 may be located closer to the front lateral surface 7 than the first region 31. The second region 33 may include an end portion on a side of the front lateral surface 7, or may be located away from the front lateral surface 7. The third region 35 may be located closer to the rear lateral surface 9 than the first region 31. The third region 35 may include an end part on a side of the rear lateral surface 9, or may be located away from the rear lateral surface 9.

The first region 31, the second region 33 and the third region 35 may have a V-shape. A comparison may be made of shapes of the first region 31, the second region 33 and the third region 35 in a cross section orthogonal to the extending direction of the lower groove 25, namely, the cross section orthogonal to the central axis O1. Specifically, a wedge angle of the first region 31 may be a first angle $\theta 1$, a wedge angle of the second region 33 may be a second angle $\theta 2$, and a wedge angle of the third region 35 may be a third angle θ3 in the cross section orthogonal to the extending direction of the lower groove 25.

As used herein, the term "wedge angle" may denote an angle formed by the pair of inclined surfaces 27 in the cross section orthogonal to the central axis O1. That is, the wedge angle of the lower groove 25 in a cross section which is orthogonal to the central axis O1 and passes through the first region 31 may be the first angle θ1. The wedge angle of the lower groove 25 in a cross section which is orthogonal to the central axis O1 and passes through the second region 33 may be the second angle θ2. The wedge angle of the lower groove 25 in a cross section which is orthogonal to the central axis O1 and passes through the third region 35 may be the third angle θ3. The wedge angle in the V-shaped groove may also be called an opening angle.

The first angle θ1 may be smaller than each of the second angle θ2 and the third angle θ3. This may lead to enhanced durability of the insert 1. Because the first angle θ1 is relatively small, the insert 1 may be less susceptible to positional deviation in the direction orthogonal to the central axis O1 in a top view.

If the second angle θ2 and the third angle θ3 are relatively large, principal force applied to the insert 1 during the cutting process may tend to be received by the second region located on a side of the front lateral surface 7 and the third region 35 located on the side of the rear lateral surface 9. Because the principal force tends to be received by the second region 33 and the third region 35, the principal force may be less likely to be applied to the first region 31 located between these regions. The insert 1 may therefore have enhanced durability.

The first angle θ1, the second angle θ2 and the third angle θ3 are not limited to a specific value. The first angle θ1 may be set to, for example, 100-140°. The second angle θ2 may be set to, for example, 120-160°. The third angle θ3 may be set to, for example, 120-160°.

The first angle θ1, the second angle θ2 and the third angle θ3 may be kept constant or changed. For example, the first angle θ1 may be changed and the second angle θ2 and the third angle θ3 may be kept constant. Specifically, the first region 31 may include a first part 37 which is located on a side of the front lateral surface 7 and whose wedge angle increases as coming closer to the rear lateral surface 9, and a second part 39 which is located on a side of the rear lateral surface 9 and whose wedge angle increases as coming closer to the front lateral surface 7.

If the first region 31 includes the first part 37, it may be easy to avoid a sharp change in wedge angle at a boundary between the first region 31 and the second region 33. If the first region 31 includes the second part 39, it may be easy to avoid a sharp change in wedge angle at a boundary between the first region 31 and the third region 35. The insert 1 may therefore have further enhanced durability.

If the second angle θ2 is kept constant, the pair of inclined surfaces 27 in the second region 33 may have a planar shape. In this case, the second region 33 may tend to be brought into surface-to-surface contact with the holder. Similarly, if the third angle θ3 is kept constant, the pair of inclined surfaces 27 in the third region 35 may have a planar shape. In this case, the third region 35 may tend to be brought into surface-to-surface contact with the holder. In this case, the principal force further may tend to be received by the second region 33 and the third region 35.

If the first angle θ1, the second angle θ2 and the third angle θ3 are changed, their respective maximum values may be compared with one another.

Figure 8:
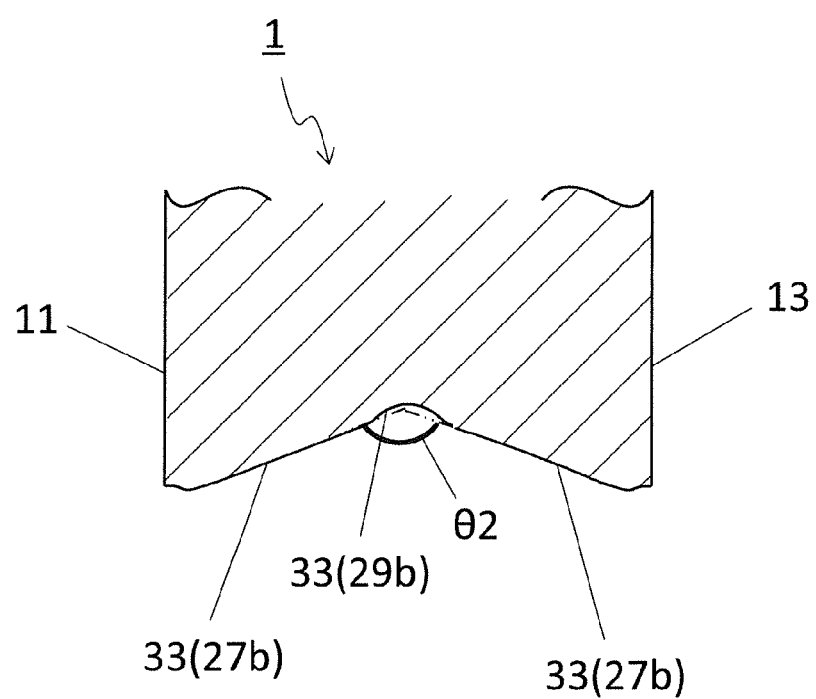
FIG. 8 is a cross-sectional view taken along the line VIII-VIII in the cutting insert illustrated in FIG. 6.
Figure 9:
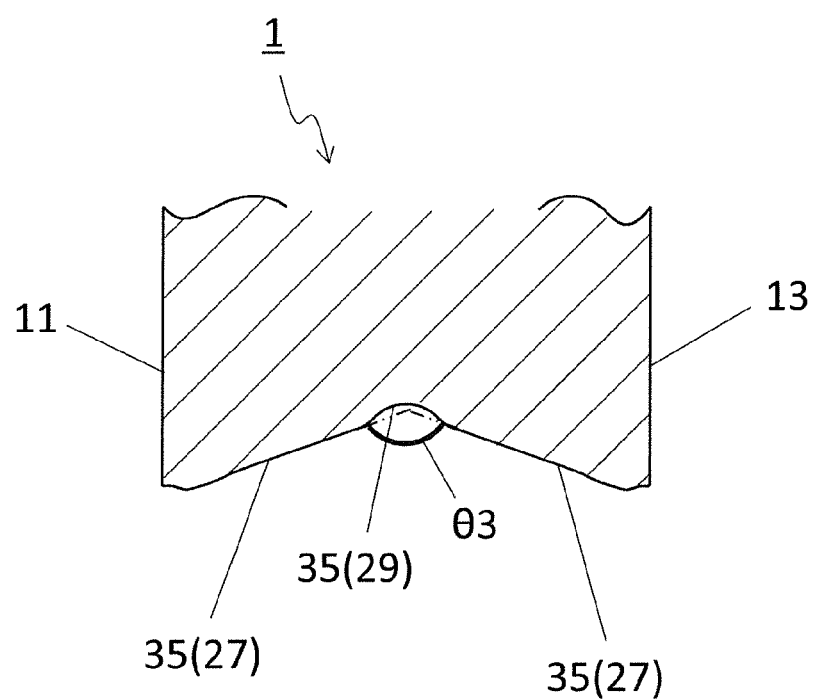
FIG. 9 is a cross-sectional view taken along the line IX-IX in the cutting insert illustrated in FIG. 6.

The second angle θ2 may be equal to or smaller than the third angle θ3. The second angle θ2 may be smaller than the third angle θ3 in an embodiment illustrated in FIGS. 8 and 9. The second region 33 may be located closer to the front lateral surface 7 than the first region 31 and the third region 35. Specifically, the second region 33 may be located closer to the first upper cutting edge 15 than the first region 31 and the third region 35.

If the second angle θ2 in the second region 33 located near the first upper cutting edge 15 subjected to cutting load during the cutting process is smaller than the third angle θ3, the insert 1 may be less susceptible to positional deviation in the direction orthogonal to the central axis O1 in a top view.

The upper constraining surface 17 may include an upper groove 41 extended from a region located near the front lateral surface 7 toward the rear lateral surface 9. The upper groove 41 may open into the front lateral surface 7, or may be located away from the front lateral surface 7. Similarly, the upper groove 41 may open into the rear lateral surface 9, or may be located away from the rear lateral surface 9.

In other words, the upper groove 41 may be extended parallel to the central axis O1 because the upper groove 41 is extended from a side of the front lateral surface 7 toward a side of the rear lateral surface 9 in the embodiment illustrated in FIG. 3. The upper groove 41 may have a V-shape in a cross section orthogonal to an extending direction thereof, namely, a cross section orthogonal to the central axis O1. That is, the upper groove 41 may include a pair of inclined surfaces 27 having a larger distance therebetween as going away from a bottom of the upper groove 41.

If the upper constraining surface 17 includes the upper groove 41, the insert 1 can be stably held by the holder. Particularly, if the upper groove 41 is extended parallel to the lower groove 25, the insert 1 can be further stably held by the holder.

Figure 10:
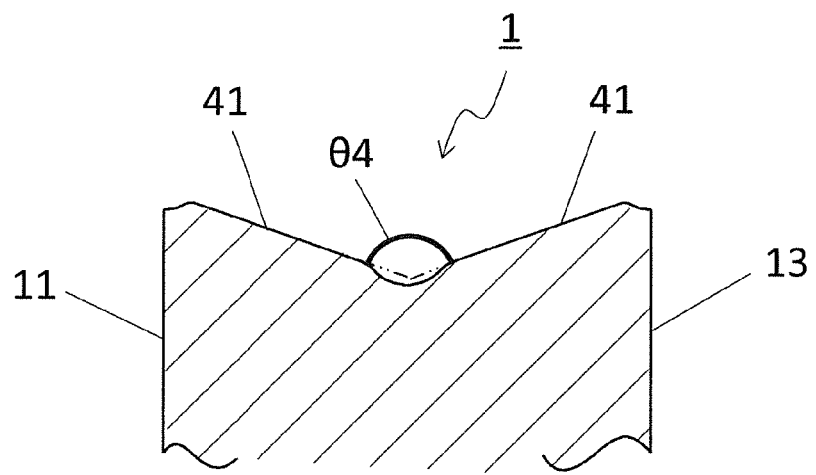
FIG. 10 is a cross-sectional view taken along the line X-X in the cutting insert illustrated in FIG. 6.

In cases where the upper groove 41 has the V-shape as in an embodiment illustrated in FIG. 10, a wedge angle of the upper groove 41 may be a fourth angle θ4. In this case, the first angle θ1 may be equal to or smaller than the fourth angle θ4. If the first angle θ1 is smaller than the fourth angle θ4, namely, if the fourth angle θ4 is larger than the first angle θ1, the insert 1 may have further enhanced durability. It may be possible to reduce the probability that cracks occur from a bottom of the upper groove 41 to a bottom of the lower groove 25, while having a relatively small value of the first angle θ1.

The insert 1 can be stably held by the holder in cases where at least parts in portions located on opposite sides of the upper groove 41 and the lower groove 25 have the same wedge angle. For example, the third region 35 may include a first portion 43 located on a side opposite to the upper constraining surface 17, and the third angle θ3 at the first portion 43 may be equal to the fourth angle θ4.

The term "having the same angle" may denote that the two angles may not be strictly the same. If a difference between the two angles is as small as approximately 2°, these two angles may be regarded as being the same.

As described earlier, the concave curved surface 29 that connects the pair of inclined surfaces 27 may be located on the bottom of the lower groove 25. For example, a bottom having a concave curved surface shape in the first region 31 may be a first bottom part 29a, and the pair of inclined surfaces 27 in the first region 31 may be first inclined surfaces 27a. That is, the first region 31 may include the first bottom part 29a having the concave curved surface shape, and the first inclined surfaces 27a that are flat and connect to the first bottom part 29a along an extending direction of the lower groove 25.

A width of the first bottom part 29a in the extending direction of the lower groove 25 may be a first width W1, and a width of each of the first inclined surfaces 27a in the extending direction of the lower groove 25 may be a second width W2. In this case, a maximum value of the first width W1 may be smaller than a maximum value of the second width W2. With this configuration, the insert 1 may be much less prone to positional deviation in the direction orthogonal to the central axis O1 in a top view.

For example, a bottom having a concave curved surface shape in the second region 33 may be a second bottom part 29b, and the pair of inclined surfaces 27 in the second region 33 may be second inclined surfaces 27b. That is, the second region 33 may include the second bottom part 29b having the concave curved surface shape, and the second inclined surfaces 27b that are flat and connect to the second bottom part 29b along the extending direction of the lower groove 25.

A width of the second bottom part 29b in the extending direction of the lower groove 25 may be a third width W3, and a width of each of the second inclined surfaces 27b in the extending direction of the lower groove 25 may be a fourth width W4. In this case, a maximum value of the third width W3 may be larger than a maximum value of the fourth width W4. This may lead to enhanced durability of the second region 33.

For example, inorganic materials, such as cemented carbide, cermet and ceramics, may be usable as a material of the insert 1. Examples of composition of the cemented carbide may include WC (tungsten carbide)-Co, WC—TiC (titanium carbide)-Co and WC—TiC—TaC (tantalum carbide)-Co, in which WC, TiC and TaC may be hard particles and Co may be a binding phase.

The cermet may be a sintered composite material obtainable by compositing metal into a ceramic component. Examples of the cermet may include compounds composed mainly of TiC or TiN (titanium nitride). Of course, it should be clear that the material of the insert 1 is not limited to these materials.

Alternatively, the insert 1 may be configured to include a base including the above material, and a coating layer that covers the base. Examples of material of the coating layer may include carbides, nitrides, oxides, oxocarbons, nitrogen oxides, carbonitrides and carboxynitrides of titanium.

The coating layer may include one or a plurality of the above materials. The coating layer may be formed by one or a plurality of layers laminated one upon another. The material of the coating layer is not limited to the above materials.

The coating layer can be located on the base by using chemical vapor deposition (CVD) method or physical vapor deposition (PVD) method.

<Cutting Tools>

Cutting tools 101 in non-limiting embodiments of the present disclosure may be described below with reference to the drawings.

Figure 11:
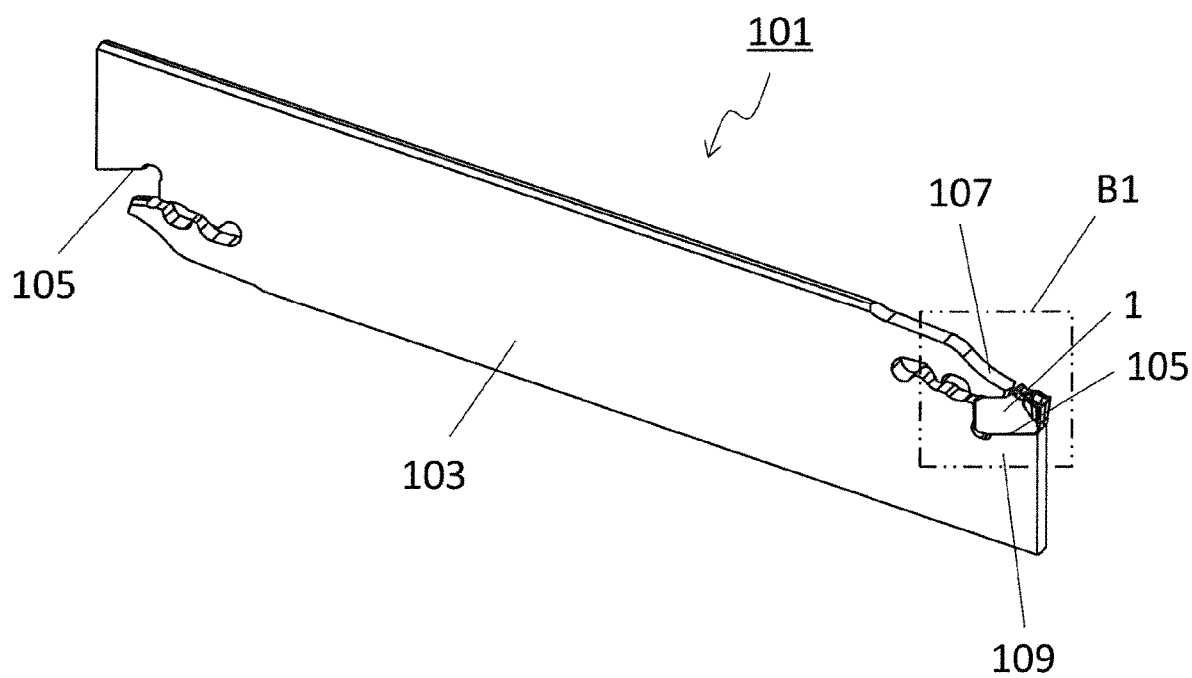
FIG. 11 is a perspective view illustrating a cutting tool in a non-limiting embodiment.

The cutting tools 101 of the non-limiting embodiments may include a holder 103 and an insert 1. The holder 103 may have a bar shape. Alternatively, as illustrated in FIG. 11, the holder 103 may have a plate shape extended from a first end (lower right end in FIG. 11) to a second end (upper left end in FIG. 11).

Figure 12:
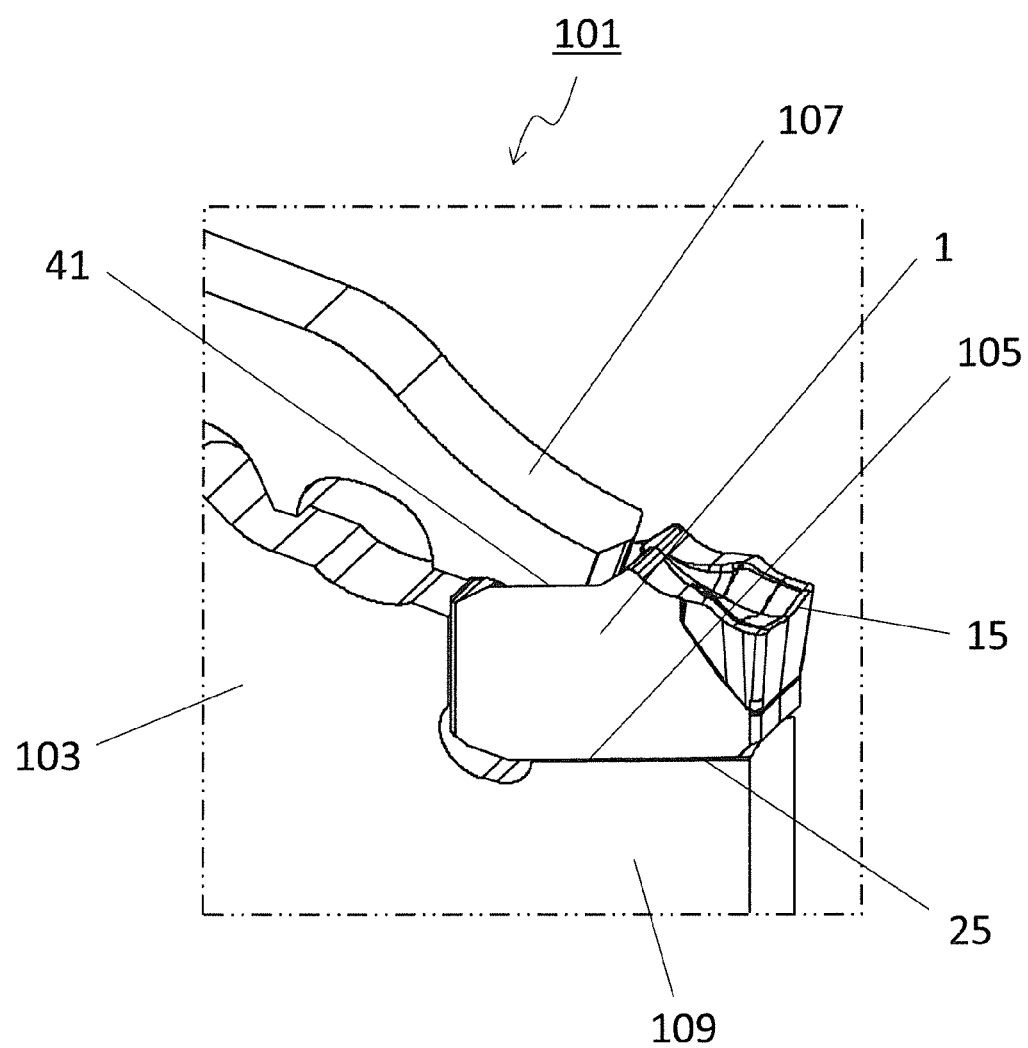
FIG. 12 is an enlarged view of a region B1 illustrated in FIG. 11.

The holder 103 may include a pocket 105 located on a side of the first end. As in an embodiment illustrated in FIG. 12, the holder 103 may include an upper jaw 107 and a lower jaw 109 which are located on a side of the first end and are located away from each other. The pocket 105 may be formed by the upper jaw 107 and the lower jaw 109.

The insert 1 may be located in the pocket 105. In other words, the insert 1 may be interposed between the upper jaw 107 and the lower jaw 109. The insert 1 may be attached so that at least a part of a region used as a cutting edge is protruded outward from the holder 103.

For example, steel and cast iron may be used as a material of the holder 103. Of these materials, the use of steel may particularly contribute to enhancing toughness of the holder 103.

The cutting tool 101 for use in a so-called turning process may be illustrated in the embodiment illustrated in FIG. 11. The cutting tools 101 in the non-limiting embodiments may be usable for a grooving process, but the use thereof is not limited thereto. There is no problem even if the cutting tools 101 in the non-limiting embodiments are used for inner diameter process, outer diameter process and traversing process.

<Method for Manufacturing Machined Product>

Methods for manufacturing a machined product 201 in non-limiting embodiments may be described below with reference to the drawings.

The machined product 201 may be manufacturable by carrying out a cutting process of a workpiece 203. The methods for manufacturing the machined product 201 in the non-limiting embodiments may include the following steps:

(1) rotating the workpiece 203;

(2) bringing the cutting tool 101 represented by the above non-limiting embodiments into contact with the workpiece 203 being rotated; and (3) moving the cutting tool 101 away from the workpiece 203.

Figure 13:
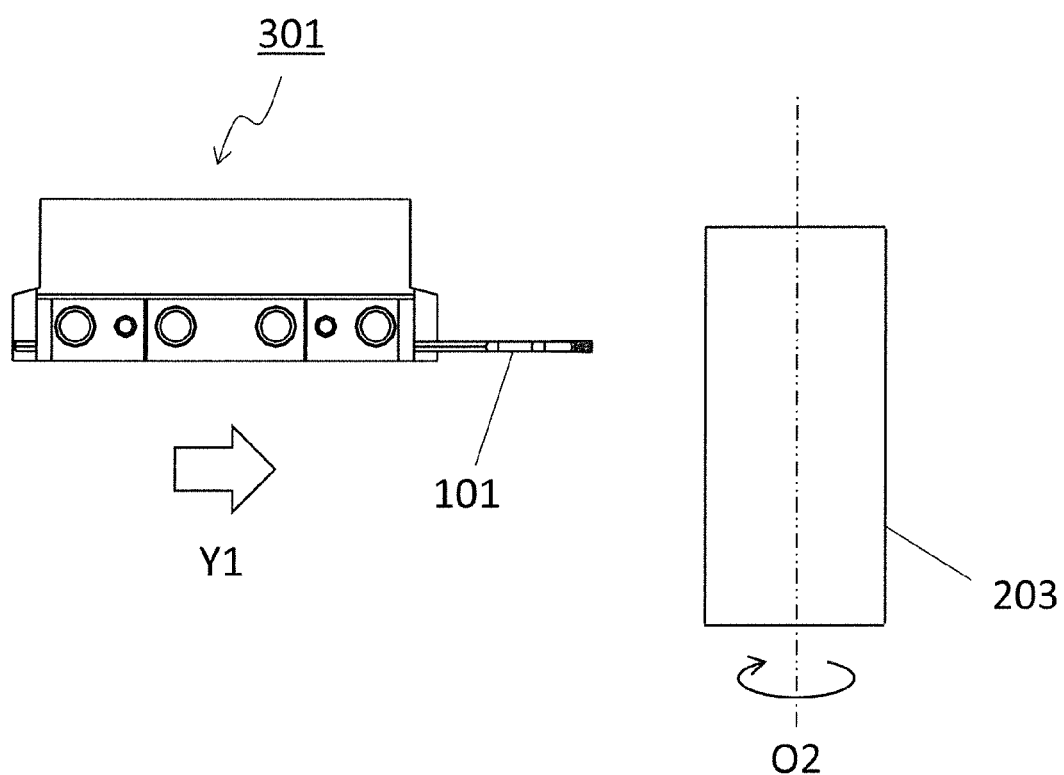
FIG. 13 is a schematic diagram illustrating one of steps in a method for manufacturing a machined product in a non-limiting embodiment.
Figure 14:
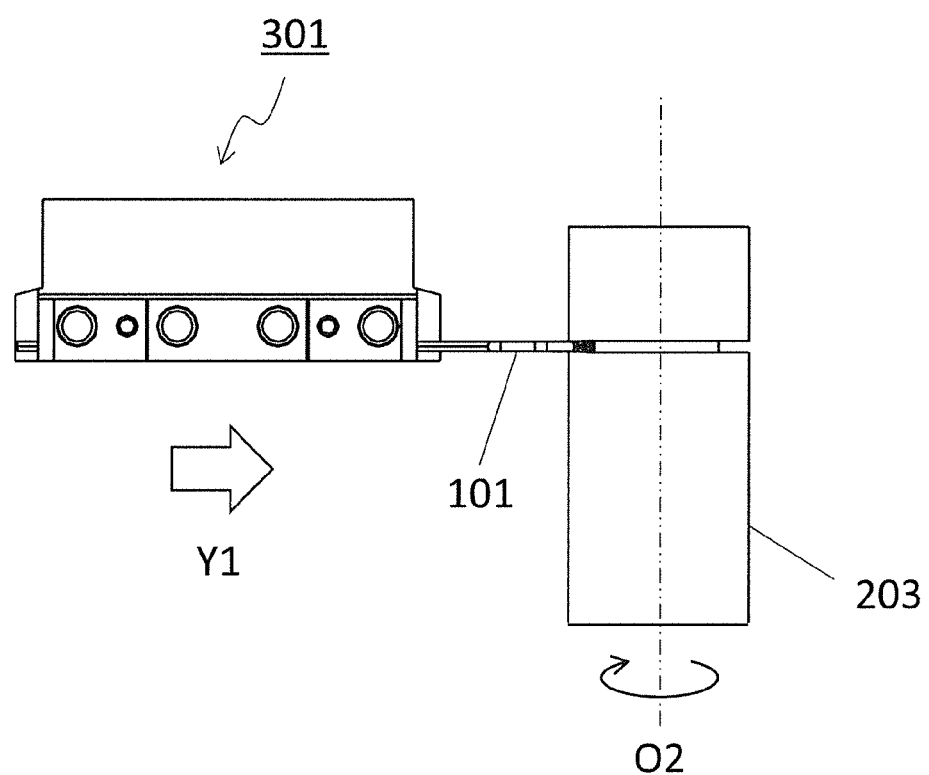
FIG. 14 is a schematic diagram illustrating one of the steps in the method for manufacturing a machined product in the non-limiting embodiment.
Figure 15:
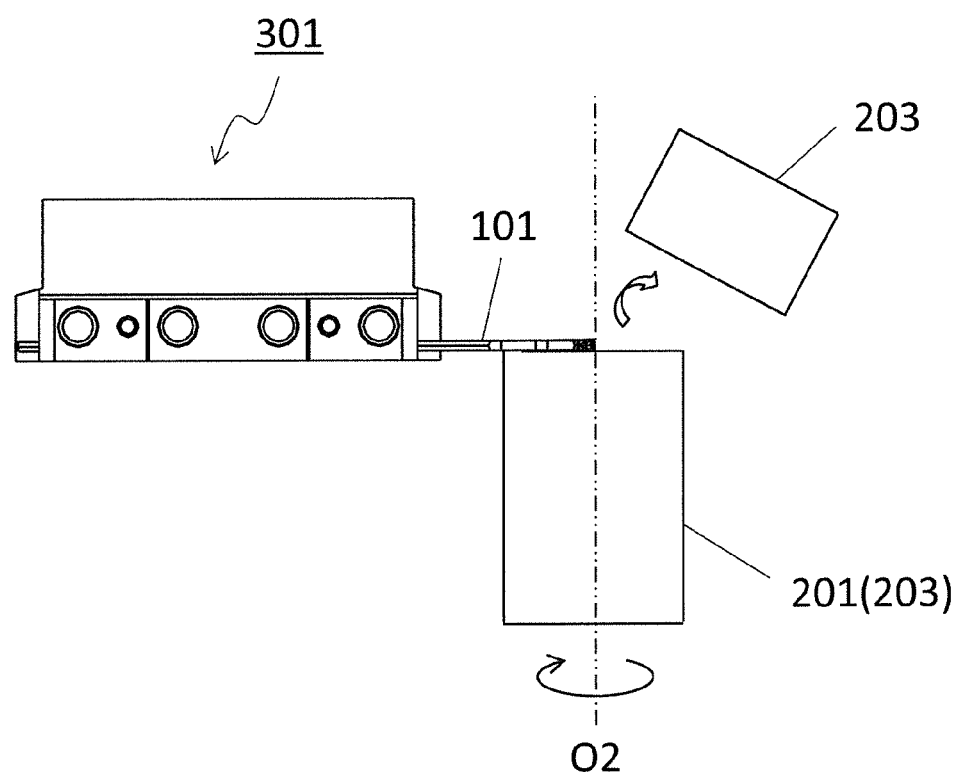
FIG. 15 is a schematic diagram illustrating one of the steps in the method for manufacturing a machined product in the non-limiting embodiment.
Figure 16:
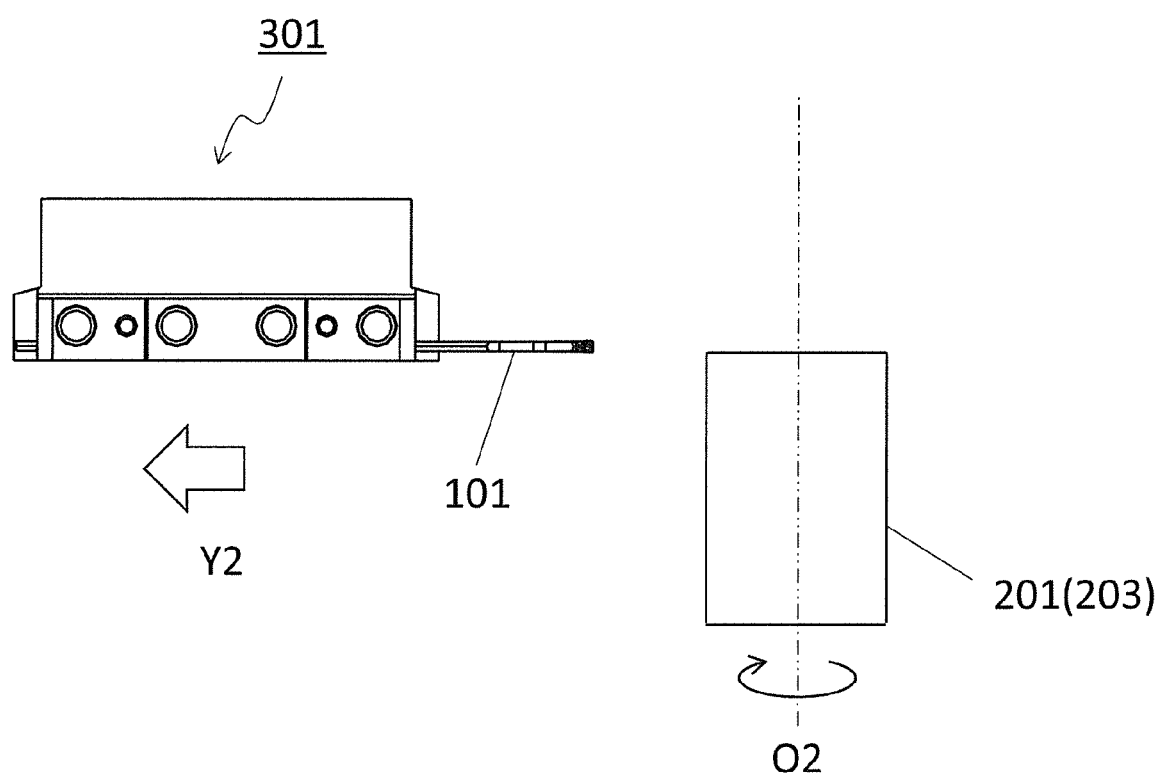
FIG. 16 is a schematic diagram illustrating one of the steps in the method for manufacturing a machined product in the non-limiting embodiment.

More specifically, firstly, the workpiece 203 may be rotated around an axis O2 as illustrated in FIG. 13, and the cutting tool 101 attached to a machine tool 301 may be relatively brought near the workpiece 203. Subsequently, the workpiece 203 may be cut out by bringing a ridgeline (cutting edge) in the cutting tool 101 into contact with the workpiece 203 as illustrated in FIGS. 14 and 15. Thereafter, the cutting tool 101 may be relatively moved away from the workpiece 203 as illustrated in FIG. 16.

In FIG. 13, the cutting tool 101 may be brought near the workpiece 203 by moving the cutting tool 101 in a Y1 direction in a state where the axis O2 is fixed and the workpiece 203 is rotated around the axis O2. In FIGS. 14 and 15, the workpiece 203 may be cut out by bringing the cutting edge in the insert 1 into contact with the workpiece 203 being rotated. In FIG. 16, the cutting tool 101 may be moved away by moving the cutting tool 101 in a Y2 direction in a state where the workpiece 203 is rotated.

In the cutting process with the manufacturing method in the non-limiting embodiments, the cutting tool 101 may be brought into contact with the workpiece 203, or the cutting tool 101 may be moved away from the workpiece 203 by moving the cutting tool 101 in the individual steps. However, it is not intended to limit to this embodiment.

For example, the workpiece 203 may be brought near the cutting tool 101 in the step (1). Similarly, the workpiece 203 may be moved away from the cutting tool 101 in the step (3). If it is desired to continue the cutting process, the step of bringing the cutting edge in the insert 1 into contact with different portions of the workpiece 203 may be repeated while keeping the workpiece 203 rotated.

Representative examples of material of the workpiece 203 may include carbon steel, alloy steel, stainless steel, cast iron or nonferrous metals.

DESCRIPTION OF THE REFERENCE NUMERAL 1 insert
3 upper surface
5 lower surface
7 front lateral surface
9 rear lateral surface
11 first lateral surface
13 second lateral surface
15 first upper cutting edge
17 upper constraining surface
19 rake surface
21 second upper cutting edge
23 lower constraining surface
25 lower groove
27 inclined surface
27a first inclined surface
27b second inclined surface
29 concave curved surface
29a first bottom part
29b second bottom part
31 first region
33 second region
35 third region
37 first part
39 second part
41 upper groove
43 first portion
101 cutting tool
103 holder
105 pocket
107 upper jaw
109 lower jaw
201 machined product
203 workpiece
301 machine tool
O1 central axis
O2 axis
θ1 first angle
θ2 second angle
θ3 third angle
θ4 fourth angle
W1 first width
W2 second width
W3 third width
W4 fourth width

The invention claimed is:

1. A cutting insert, comprising:
an upper surface;
a lower surface located on a side opposite to the upper surface;
a front lateral surface located between the upper surface and the lower surface; and
a rear lateral surface located between the upper surface and the lower surface and located on a side opposite to the front lateral surface,
the upper surface comprising
a first upper cutting edge located on an intersection with the front lateral surface, and
an upper constraining surface which is located closer to the rear lateral surface than the first upper cutting edge and is contactable with a holder,
the lower surface comprising a lower constraining surface contactable with the holder,
the lower constraining surface comprising a lower groove having a V-shape extended from a region located near the front lateral surface toward the rear lateral surface,
the lower groove comprising
a first region located on a side opposite to the upper constraining surface,
a second region located closer to the front lateral surface than the first region, and
a third region located closer to the rear lateral surface than the first region,
wherein
a wedge angle of the first region is a first angle, a wedge angle of the second region is a second angle and a wedge angle of the third region is a third angle in a cross section orthogonal to an extending direction of the lower groove,
the first angle is smaller than each of the second angle and the third angle, and
the second angle is smaller than the third angle.

2. The cutting insert according to claim 1, wherein
the upper constraining surface comprises an upper groove having a V-shape extended from a region located near the front lateral surface toward the rear lateral surface, and
the upper groove is extended parallel to the lower groove.

3. The cutting insert according to claim 2, wherein
a wedge angle of the upper groove is a fourth angle in a cross section orthogonal to an extending direction of the upper groove, and
the first angle is smaller than the fourth angle.

4. The cutting insert according to claim 3, wherein
the third region comprises a first portion located on a side opposite to the upper constraining surface, and
the third angle at the first portion is equal to the fourth angle.

5. The cutting insert according to claim 1, wherein
the first region comprises
a first bottom part having a concave curved surface shape, and
a first inclined surface that is flat and connects to the first bottom part along an extending direction of the lower groove,
a width of the first bottom part in the extending direction of the lower groove is a first width, and a width of the first inclined surface in the extending direction of the lower groove is a second width, and
a maximum value of the first width is smaller than a maximum value of the second width.

6. The cutting insert according to claim 1, wherein
the second region comprises
a second bottom part having a concave curved surface shape, and
a second inclined surface that is flat and connects to the second bottom part along an extending direction of the lower groove,
a width of the second bottom part in the extending direction of the lower groove is a third width, and a width of the second inclined surface in the extending direction of the lower groove is a fourth width, and
a maximum value of the third width is larger than a maximum value of the fourth width.

7. A cutting tool, comprising:
a holder which has a plate shape extended from a first end to a second end and comprises a pocket located on a side of the first end; and the cutting insert according to claim 1, the cutting insert being located in the pocket.

8. A method for manufacturing a machined product, comprising:
- rotating a workpiece;
- bringing the cutting tool according to claim 7 into contact with the workpiece being rotated; and
- moving the cutting tool away from the workpiece.

9. A cutting insert, comprising:
- an upper surface;
- a lower surface located on a side opposite to the upper surface;
- a front lateral surface located between the upper surface and the lower surface; and
- a rear lateral surface located between the upper surface and the lower surface and located on a side opposite to the front lateral surface,
- the upper surface comprising
  - a first upper cutting edge located on an intersection with the front lateral surface, and
  - an upper constraining surface which is located closer to the rear lateral surface than the first upper cutting edge and is contactable with a holder,
- the lower surface comprising a lower constraining surface contactable with the holder,
- the lower constraining surface comprising a lower groove having a V-shape extended from a region located near the front lateral surface toward the rear lateral surface,
- the lower groove comprising
  - a first region located on a side opposite to the upper constraining surface,
  - a second region located closer to the front lateral surface than the first region, and
  - a third region located closer to the rear lateral surface than the first region,
- wherein
- a wedge angle of the first region is a first angle, a wedge angle of the second region is a second angle and a wedge angle of the third region is a third angle in a cross section orthogonal to an extending direction of the lower groove,
- the first angle is smaller than each of the second angle and the third angle,
- the first region comprises
  - a first bottom part having a concave curved surface shape, and
  - a first inclined surface that is flat and connects to the first bottom part along an extending direction of the lower groove,
- a width of the first bottom part in the extending direction of the lower groove is a first width, and a width of the first inclined surface in the extending direction of the lower groove is a second width, and
- a maximum value of the first width is smaller than a maximum value of the second width.

10. The cutting insert according to claim 9, wherein
the upper constraining surface comprises an upper groove having a V-shape extended from a region located near the front lateral surface toward the rear lateral surface, and
the upper groove is extended parallel to the lower groove.

11. The cutting insert according to claim 10, wherein
a wedge angle of the upper groove is a fourth angle in a cross section orthogonal to an extending direction of the upper groove, and
the first angle is smaller than the fourth angle.

12. The cutting insert according to claim 11, wherein
the third region comprises a first portion located on a side opposite to the upper constraining surface, and
the third angle at the first portion is equal to the fourth angle.

13. A cutting tool, comprising:
a holder which has a plate shape extended from a first end to a second end and comprises a pocket located on a side of the first end; and
the cutting insert according to claim 9, the cutting insert being located in the pocket.

14. A method for manufacturing a machined product, comprising:
- rotating a workpiece;
- bringing the cutting tool according to claim 13 into contact with the workpiece being rotated; and
- moving the cutting tool away from the workpiece.

15. A cutting insert, comprising:
- an upper surface;
- a lower surface located on a side opposite to the upper surface;
- a front lateral surface located between the upper surface and the lower surface; and
- a rear lateral surface located between the upper surface and the lower surface and located on a side opposite to the front lateral surface,
- the upper surface comprising
  - a first upper cutting edge located on an intersection with the front lateral surface, and
  - an upper constraining surface which is located closer to the rear lateral surface than the first upper cutting edge and is contactable with a holder,
- the lower surface comprising a lower constraining surface contactable with the holder,
- the lower constraining surface comprising a lower groove having a V-shape extended from a region located near the front lateral surface toward the rear lateral surface,
- the lower groove comprising
  - a first region located on a side opposite to the upper constraining surface,
  - a second region located closer to the front lateral surface than the first region, and
  - a third region located closer to the rear lateral surface than the first region,
- wherein
- a wedge angle of the first region is a first angle, a wedge angle of the second region is a second angle and a wedge angle of the third region is a third angle in a cross section orthogonal to an extending direction of the lower groove,
- the first angle is smaller than each of the second angle and the third angle,
- the second region comprises
  - a second bottom part having a concave curved surface shape, and
  - a second inclined surface that is flat and connects to the second bottom part along an extending direction of the lower groove,
- a width of the second bottom part in the extending direction of the lower groove is a third width, and a width of the second inclined surface in the extending direction of the lower groove is a fourth width, and
- a maximum value of the third width is larger than a maximum value of the fourth width.

16. The cutting insert according to claim 15, wherein
the upper constraining surface comprises an upper groove having a V-shape extended from a region located near the front lateral surface toward the rear lateral surface, and
the upper groove is extended parallel to the lower groove.

17. The cutting insert according to claim 16, wherein
a wedge angle of the upper groove is a fourth angle in a cross section orthogonal to an extending direction of the upper groove, and
the first angle is smaller than the fourth angle.

18. The cutting insert according to claim 17, wherein
the third region comprises a first portion located on a side opposite to the upper constraining surface, and
the third angle at the first portion is equal to the fourth angle.

19. A cutting tool, comprising:
a holder which has a plate shape extended from a first end to a second end and comprises a pocket located on a side of the first end; and
the cutting insert according to claim 15, the cutting insert being located in the pocket.

20. A method for manufacturing a machined product, comprising:
rotating a workpiece;
bringing the cutting tool according to claim 19 into contact with the workpiece being rotated; and
moving the cutting tool away from the workpiece.

* * * * *